Patented Oct. 5, 1943

2,330,826

UNITED STATES PATENT OFFICE 2,330,826

MANUFACTURE OF RESIN-SURFACED WOOD

James Victor Hunn, Chicago, Ill., assignor to The Sherwin-Williams Company, Cleveland, Ohio, a corporation of Ohio No Drawing. Application July 22, 1940, Serial No. 346,804

9 Claims. (Cl. 117—148)

The present invention relates to the treatment of wood to prevent the bleeding therefrom of a stain which is detrimental to the use of such wood.

Cocobola wood is an example of a hard and dense wood having desirable properties as handles on knives, forks, spoons and other implements. The desirability of the wood is offset when it is subjected to washing, as with soap and water. The sap, resin or like content of the wood is affected by water, soap and alkali, which cause the wood to emit a stain, as for example when wiping a washed article on a towel.

Heretofore, attempts to remedy this defect have been unsuccessful. For example, attempts to extract the staining material with soap or alkali solution, injured the structure and appearance of the wood, and also failed in completely extracting the stain. Attempts to impregnate it with synthetic resin compositions were too expensive. The present invention may be used to overcome these defects of cocobola wood for washable handles, and of course has application to other uses of like woods.

The general object of the invention is to utilize the natural constituents of the wood to form a synthetic resin by reacting the constituents in situ with an applied resin-forming agent.

A particular object of the invention is to react an aldehyde with the natural constituents of wood in situ to form a synthetic resin.

A particular object of the invention is to react cocobola wood with an aldehyde to form in situ a synthetic resin within the wood.

A further object of the invention is to treat partly completed articles such as knife handles, with an aldehyde to impregnate the article near the surface with a synthetic resin formed in situ.

Various other and ancillary objects and advantages of the invention will become apparent from the following description and explanation of the invention.

For the purpose of illustrating the invention, the detailed description will be limited to knife handles of cocobola wood without intent to limit the invention.

Knife handles of cocobola wood are cut and formed to substantially the desired shape, then treated to the resin-forming process, and then buffed, finished or polished to the desired final form or appearance. Because cocobola wood is very hard and dense, and because the preferred treatment is effected without using the known vacuum methods to secure deep impregnation, it is desirable that the handles be so formed prior to treatment, that the finishing operations do not remove too much of the treated surface layers.

The present invention is based in part upon the discovery that woods are available with a natural content which is reactive like a phenol in a process wherein phenol and aldehyde combine to form synthetic resin. It is not necessary to the invention that the wood content be a phenol or phenolic, but only that it be phenolic-reacting, and it is so referred to in this description.

Formaldehyde is the preferred aldehyde because of its low cost, and because of its reactive properties with phenolic reacting substances. Materials which produce formaldehyde, such as paraformaldehyde and hexamethylenetetramine, may be used to provide the formaldehyde. Commercial formalin solution is preferred. The wood is immersed in a bath containing the aldehyde per se or in available form.

The resin-forming reactions useful for the present invention require a catalyst. The reaction desired is that taking place in the wood, rather than in a bath which, by the way, also extracts some constituent from the wood. Accordingly, a catalyst is used which may impregnate the wood, there to exert its function. Hence a catalyst is used which is soluble in the bath in which the wood is immersed or otherwise in contact.

The dense and hard character of cocobola wood limits the ability of the wood to be penetrated by the bath with its dissolved catalyst and aldehyde. Air in the wood is also obstructive. The natural wood to a degree resists penetration, and such resistance may be lowered by use of a wetting agent. A volatile catalyst is preferred since any residue of it in the wood may be removed in a subsequent baking treatment wherein the formed resin is hardened. Nevertheless, the invention is not limited with respect to the catalyst, of which many forms are known for the phenolic-aldehyde type of resins.

The preferred catalyst is a hydrochloric acid in low concentration in the bath containing the aldehyde and wetting agent. A formalin bath containing not over 0.6% of hydrochloric acid, and wetting agent, shows an extracting action on cocobola wood which is concurrent with the condensation occurring in the wood. The bath appears to extract some of the phenolic-reacting content of the wood, forming a color and also a solid condensation product in the bath, which may be readily filtered from the bath. When the solid content of a bath becomes too heavy, it may be filtered off, and the colored liquor used again, if necessary with boosting of its desired constituents. A bath may be considerably spent as to its content of aldehyde, catalyst and wetting agent before boosting is required.

For example, where a commercial formalin solution is employed it will show about 35% to 37% formaldehyde by weight. Where this is made up to 0.6% hydrochloric acid for a catalyst, the bath will still give good results until the formaldehyde is as low as 25%, or until the acid is as low as 0.2%. The wetting agent may be renewed in proportion as the aldehyde or the acid is renewed. Excess of acid is feasible up to the point where it injures the wood.

*Example 1*

A bath is prepared as follows:

| | Parts by weight |
|---|---|
| Formalin (37½%) | 6,000 |
| "Aerosol O. T." | 60 |
| Hydrochloric acid (32%) | 120 |

The "Aerosol O. T." is a trade marked product of the American Cyanamid Company, identified as dioctyl ester of sodium sulfosuccinic acid and is merely an example of various wetting agents. The same company provides also "Aerosol O. S." which is isopropyl naphthalene-sodium sulfonate. These are two distinct types of wetting agents which may be used in the present invention. The wetting agent required for this invention is of course one which so functions in the acid solution, many others being well known. Another is sodium abietene sulfonate.

Cocobola wood knife handles are immersed in the bath at a temperature of 180° to 205° F. for three hours. Then they are removed, and drained. Then they are heated in a ventilated oven at 210°–220° F. for 4 to 16 hours. Commercially, 4 to 5 hours heating at 220° F. is sufficient.

The resulting handles are easily buffed and polished to a marble-like appearance, and are washable with water which is soapy or alkaline, without injury to the handle, and without raising a stain when handled or wiped. In the process color is extracted from a depth of from 1/64 to 1/8 inch. Resin is formed in the superficial layers to about the same depth, and so formed, it seals the surface against penetration of washing solutions to extract color, resin or other constituents within the wood. By using evacuation procedure on the wood, the penetration may be increased.

It is also to be understood that the wood may be preliminarily impregnated with wetting agent, rather than the same be made a constituent of the bath. It is the presence of the wetting agent at the wood that is important.

It is of course to be understood that the details of the procedure are merely illustrative, and that many changes in conditions may be made adapting the known resin forming processes, involving phenolic reacting substances, to woods containing such substances as a natural constituent.

Hydrochloric acid is the preferred catalyst because of its volatility, but it is merely one of the known acid catalysts for this type of resin. Where other strong mineral acid catalysts are used, such as phosphoric acid and sulfuric acid, substantially the same concentrations as for hydrochloric, are effective. Where weaker acid catalysts are used, such as oxalic acid, a stronger concentration is required, such as 1 to 3%.

Numerous departures from the specific example are contemplated as falling within the scope of the appended claims.

I claim:

1. The method of treating cocobola wood having its natural phenolic-reacting constituents which when treated with an aldehyde form an insoluble condensation product, which comprises subjecting the wood to contact with an aqueous bath containing a resin-forming agent consisting of available water-soluble aldehyde, a resin-forming catalyst for a phenolic-aldehyde type of resin, and a wetting agent, allowing the bath to penetrate the wood to form in situ a reactive phenolic-aldehyde type of condensation product by reaction of the aldehyde with said constituents of the wood, withdrawing the wood from the bath, and finally reacting the said condensation product to form a final resin in situ in the wood.

2. The method of treating cocobola wood having its natural phenolic-reacting constituents which when treated with an aldehyde form an insoluble condensation product, which comprises subjecting the wood to contact with an aqueous bath containing a resin-forming agent consisting of available formaldehyde, a resin-forming catalyst for a phenolic-aldehyde type of resin, and a wetting agent, allowing the bath to penetrate the wood to form in situ a reactive phenolic-aldehyde type of condensation product by reaction of the formaldehyde with said constituents of the wood, withdrawing the wood from the bath, and finally reacting the said condensation product to form a final resin in situ in the wood.

3. The method of treating cocobola wood having its natural phenolic-reacting constituents which when treated wtih an aldehyde form an insoluble condensation product, which comprises subjecting the wood to contact with an aqueous bath containing a resin-forming agent consisting of available formaldehyde, hydrochloric acid as catalyst, and a wetting agent, allowing the bath to penetrate the wood to form in situ a reactive phenolic-aldehyde type of condensation product by reaction of the formaldehyde with said constituents of the wood, withdrawing the wood from the bath, and finally reacting the said condensation product to form a final resin in situ in the wood.

4. The method of treating cocobola wood having its natural phenolic-reacting constituents which when treated with an aldehyde form an insoluble condensation product, which comprises subjecting the wood to contact with an aqueous bath containing a resin-forming agent consisting of available water-soluble aldehyde, hydrochloric acid as catalyst, and a wetting agent, allowing the bath to penetrate the wood to form in situ a reactive phenolic-aldehyde type of condensation product by reaction of the aldehyde with said constituents of the wood, withdrawing the wood from the bath, and finally reacting the said condensation product to form a final resin in situ in the wood.

5. The method of treating cocobola wood having its natural phenolic-reacting constituents which when treated with an aldehyde form an insoluble condensation product, which comprises subjecting the wood to contact with an aqueous bath containing a resin-forming agent consisting of available water-soluble aldehyde, and a resin-forming catalyst for a phenolic-aldehyde type of resin, allowing the bath to penetrate the wood in the presence of and in contact with a wetting agent to form in situ a reactive phenolic-aldehyde type of condensation product by reaction of the aldehyde with said constituents of the wood, withdrawing the wood from the bath, and finally reacting the said condensation product to form a final resin in situ in the wood.

6. The method of treating cocobola wood having its natural phenolic-reacting constituents which when treated with an aldehyde form an insoluble condensation product, which comprises subjecting the wood to contact wtih an aqueous bath containing a resin-forming agent consisting of available water-soluble aldehyde, and hydrochloric acid as catalyst, allowing the bath to penetrate the wood in the presence of and in contact with a wetting agent to form in situ a reactive phenolic-aldehyde type of condensation product by reaction of the aldehyde with said constituents of the wood, withdrawing the wood from the bath, and finally reacting the said condensation product to form a final resin in situ in the wood.

7. The method of treating cocobola wood having its natural phenolic-reacting constituents which when treated with an aldehyde form an insoluble condensation product, which comprises subjecting the wood to contact with an aqueous bath containing a resin-forming agent consisting of available formaldehyde, and a resin-forming catalyst for a phenolic-aldehyde type of resin, allowing the bath to penetrate the wood in the presence of and in contact with a wetting agent to form in situ a reactive phenolic-aldehyde type of condensation product by reaction of the formaldehyde with said constituents of the wood, withdrawing the wood from the bath, and finally reacting the said condensation product to form a final resin in situ in the wood.

8. The method of treating cocobola wood having its natural phenolic-reacting constituents which when treated with an aldehyde form an insoluble condensation product, which comprises subjecting the wood to contact with an aqueous bath containing a resin-forming agent consisting of available formaldehyde, and hydrochloric acid as catalyst, allowing the bath to penetrate the wood in the presence of and in contact with a wetting agent to form in situ a reactive phenolic-aldehyde type of condensation product by reaction of the formaldehyde with said constituents of the wood, withdrawing the wood from the bath, and finally reacting the said condensation product to form a final resin in situ in the wood.

9. Cocobola wood containing its natural phenolic-reacting constituents, which when treated with an aldehyde, form an insoluble condensation product, a layer of the wood adjacent the surface containing a finally-reacted phenol-aldehyde type of resin formed in situ in the wood as a result of penetration into the wood of a bath containing a resin-forming catalyst for a phenolic-aldehyde type of resin and containing a resin-forming agent consisting of available water-soluble aldehyde, said resin being formed in said layer as a result of penetration into the wood by said bath in the presence of and in contact with a wetting agent, and said resin being a product of reaction in situ in the wood between aldehyde from the bath and said reactive constituents in the wood, and of a second and final reaction brought about after removal of the wood from the bath, said second reaction being in situ in the wood and effected on the product of the first reaction.

JAMES V. HUNN.